United States Patent [19]

Fisher et al.

[11] 4,116,153

[45] Sep. 26, 1978

[54] ELASTIC ELECTRICALLY-CONDUCTIVE STRAIN CABLE

[75] Inventors: Frederick H. Fisher; Victor C. Anderson, both of San Diego, Calif.

[73] Assignee: The United States of America as represented by the Secretary of the Navy, Washington, D.C.

[21] Appl. No.: 784,020

[22] Filed: Apr. 4, 1977

[51] Int. Cl.$^2$ .................. B63B 21/56; H01B 7/06
[52] U.S. Cl. .................. 114/244; 174/9 F; 174/88 C; 174/69
[58] Field of Search .................. 174/69, 70 R, 113 C, 174/131 A, 9 F, 88 C; 114/244, 253

[56] References Cited

U.S. PATENT DOCUMENTS 2,456,015  12/1948  Orser .................. 174/69

*Primary Examiner*—Thomas J. Kozma
*Attorney, Agent, or Firm*—Richard S. Sciascia; Paul N. Critchlow

[57] ABSTRACT

The cable includes bundles of plastic-impregnated nylon fibers acting both as strain members and strain accumulators. An inner core bundle is wound with an electrical conductor that stretches with the fibers when the cable is tensioned. The winding pitch assures that the fractional change in volume per fractional change in length is the same for the winding as it is for the fibers. An outer sheath-like bundle surrounds the inner bundle and its winding. Preferably, the cable is used as a limited length section of an otherwise conventional co-axial cable for suspending various objects from a ship. The section length is limited to that needed for its accumulator action.

8 Claims, 6 Drawing Figures

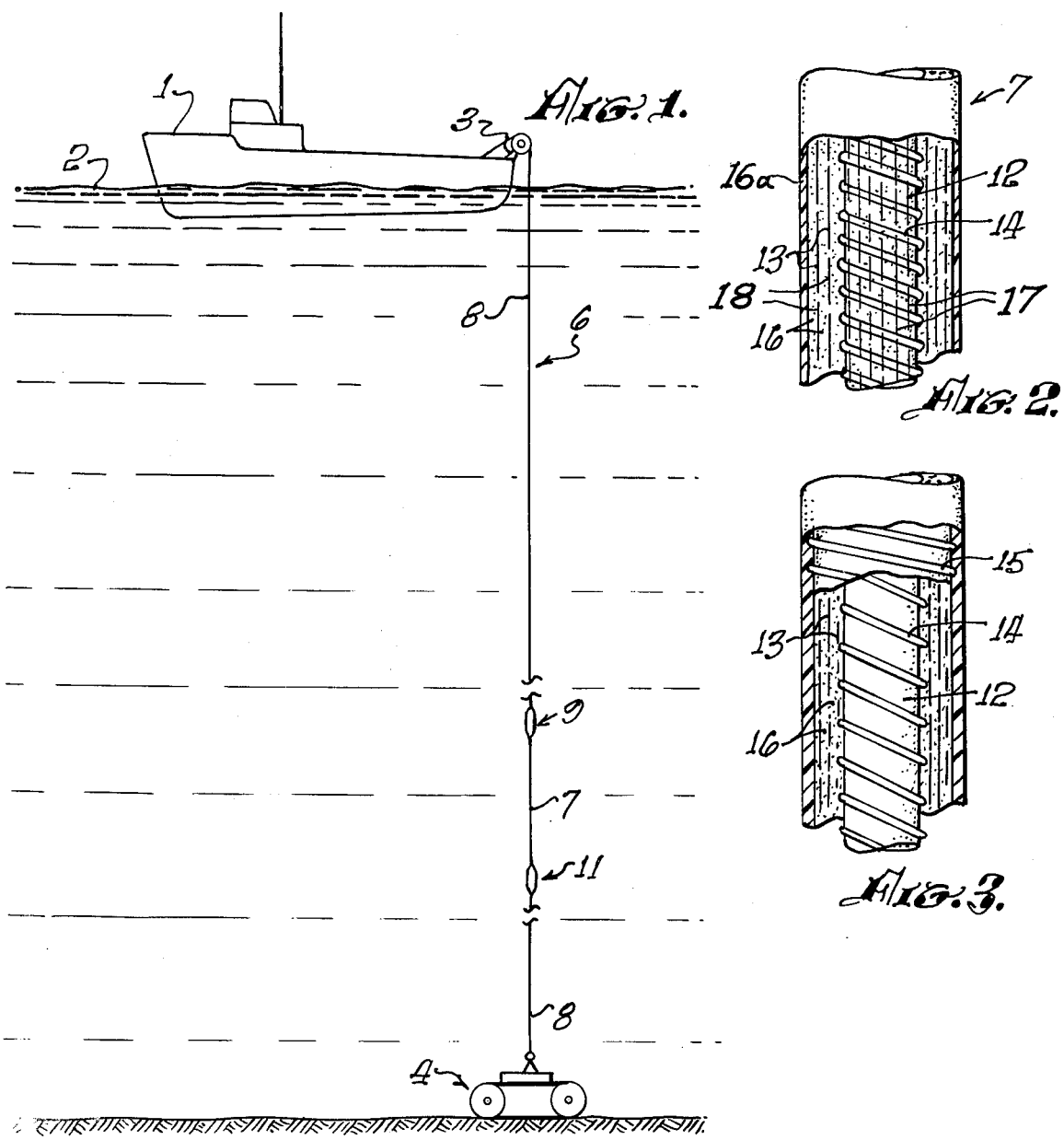
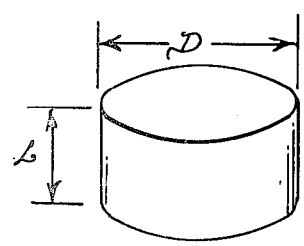 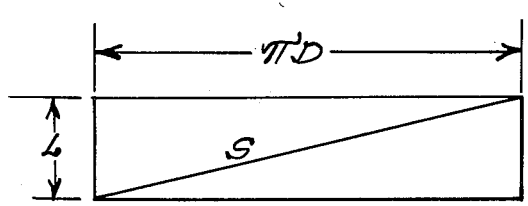

U.S. Patent  Sept. 26, 1978  Sheet 2 of 2  4,116,153
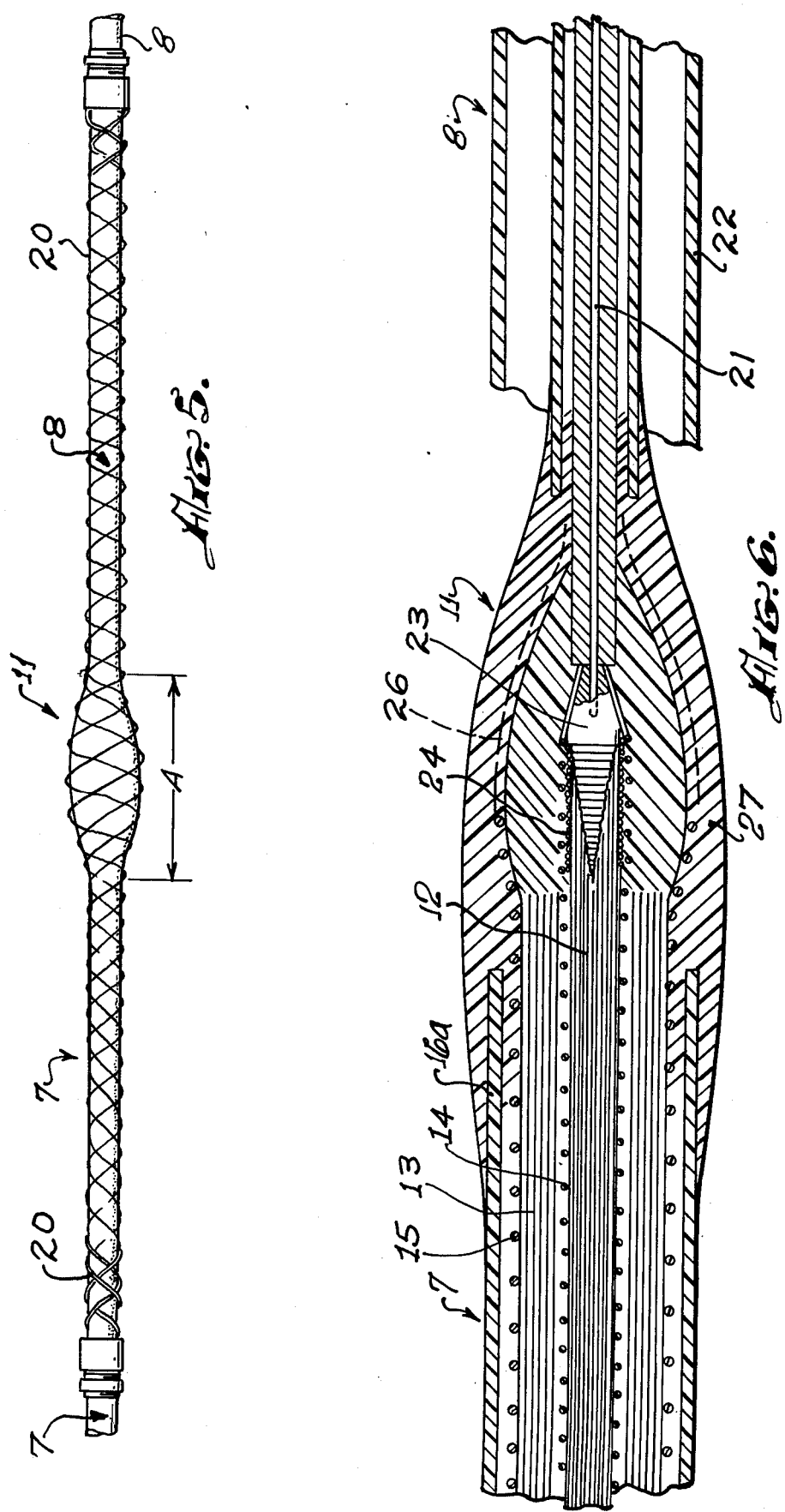

ELASTIC ELECTRICALLY-CONDUCTIVE STRAIN CABLE

BACKGROUND OF THE INVENTION

The invention relates to cable suspension of loads from a ship and, in particular, to elastic cables capable of absorbing cable-tension forces produced by wave action and the like.

Underwater cables are used to support oceanographic instruments or other loads at fixed depths or to facilitate the operation of underwater vehicles such as the well-known RUM which is a remotely-controlled bottom crawling vehicle. Such loads or vehicles are electrically-powered or controlled and, customarily, co-axial cables are employed both to provide the necessary support and to supply the electrical power or control frequencies. One difficulty with such operations is that the ship or platform is constantly moving in response to wave action which, at times, may be quite severe. As a result, the load or vehicle does not maintain its desired underwater position. Another difficulty is that the co-axial cables are recovered by ship-mounted winches and, unless fully protected, they all too often are damaged in their travel over sheaves or through snatch blocks etc.

These difficulties, of course, are well-known and various remedies have been suggested. For example, with regard to the wave-action displacement, there have been attempts to provide accumulator mechanisms at the winch end of the cable but, for the most part, these suggestions have been quite complex, expensive and somewhat unreliable. As to the physical protection needed for the cables, armored co-axial cables are widely-used but, of course, such cables inherently preclude any elasticity or, in other words, the ability to stretchably absorb the wave action. Other special cables which do have some elasticity are known although, in general, such cables either are not capable of the desired underwater accumulator action or they are not of a type that can reliably withstand the rough handling by winches, shocks and the like. A further problem inherent in the underwater use of co-axial cables is that the stretching action itself may seriously alter the electrical properties of the co-axial conductors by, for example, varying their desired electrical impedance or otherwise modulating the designed electrical properties.

It is therefore an object of the present invention to provide a co-axial cable adapted for underwater use that is stretchably capable of absorbing any anticipated wave action displacements of the supported loads without materially affecting its electrical properties.

Another object is to provide such a co-axial cable that is physically constructed so as to provide reliable protection against physical damage by winch handling or the like.

A further object is to provide the cable in a simple, inexpensive manner which permits economical use in a wide variety of routine operations.

Other objects and their attendant advantage will become apparent in the following description.

DESCRIPTION OF THE DRAWINGS

The present invention is illustrated in the accompanying drawings of which:

FIG. 1 functionally illustrates one of the intended uses;

FIG. 2 is an enlarged partially-sectioned view of one form of the present cable;

FIG. 3 is a view similar to FIG. 2 of an alternate construction;

FIG. 4 is a geometric representation of a unit cable length showing particular dimensions used in determining the proper pitch of its helical conductor;

FIG. 5 illustrates one manner in which the strain cable can be coupled to a conventional co-axial underwater cable, and FIG. 6 is a sectional view of one end of the coupling identified as portion A in FIG. 5.

DETAILED DESCRIPTION OF THE INVENTION

FIG. 1 shows a ship 1 riding on sea waves 2 supporting, by means of a conventional winch mechanism 3, a load 4 which, for example, may be a bottom crawling vehicle, such as the well-known RUM vehicle. As will be appreciated the RUM is a mobile vehicle adapted, among other purposes, to observe bottom phenomena and to manipulate, by means of remotely-controlled arms, objects that are observed. Its mechanisms, consequently, must be electrically energized and for this purpose its support cable, generally identified as cable 6, conventionally is a co-axial cable which carries appropriate electrical power and signals from a shipboard control station of the vehicle. Additionally, the cable must be a strain cable of sufficient strength to support the load or the vehicle during its operations as well as during its deployment and recovery which, in the usual manner, are controlled by the winched reel on which the cable is wound.

One problem experienced in these bottom operations involves the fact that the wave-produced pitching movement of the ship is transmitted to the cable. Such forces, in turn, either may break the cable or prevent its load from maintaining its desired position on the ocean bottom. For example, ships frequently experience waves of 10 feet or more and, unless the resulting forces are safely absorbed, the load may be lost or its operation seriously impaired.

The present invention provides an elastic strain cable capable of absorbing wave-produced tension and, as will become clearer, of absorbing the forces in a manner that does not materially affect the electrical properties needed for the remote control. If desired, the entire length of cable 6 may be elasticized in a manner to be described. Preferably, however, a predetermined length of the elastic cable is coupled into a co-axial cable of conventional construction. The length of the elastic portion or section is, in turn, dependent upon its elastic properties. Most suitably, it is limited to a length sufficient to absorb, for example, the ten foot waves that might be anticipated. FIG. 1 illustrates the use of an elastic section 7 coupled into a conventional co-axial cable 8 which forms the major length of the entire cable support identified by numeral 6. As shown, the elastic cable section 7 is that portion of the entire cable that extends between its end couplings 9 and 11 (FIG. 1). It will be appreciated that the actual length of section 7 usually will be quite short compared to the full cable length needed to place the load on the ocean bottom.

As shown in FIG. 2, elastic cable 7 is formed in a relatively simple manner of several components which, generally considered, include an inner strain member 12, an outer strain member 13, a helical winding or conductor 14 and an insulating plastic 16 that impregnates the interstices of the cable to bind its components into a unit having the desired geometrical configuration in which the components are securely held in their proper positions. Inner strain member 12 provides an axially-extending core on which conductor 14 is spirally wound and, as will be described, the pitch of the spiral winding is a significant functional consideration requiring rather close control. In manners well known to the art, the spiral winding is formed of wire-like conductors which can be adjusted in numbers and dimensions to provide the desired electrical impedance for the particular object that is being deployed.

Inner and outer strain members 12 and 13 are formed of bundles of continuous, elastomeric plastic fibers 17 and 18 which, for purposes to be described, are of a material selected for its elastic properties. In particular, materials such as nylon, polyvinyl chloride (PVC) or Dacron can be employed since each of these materials can be provided in the form of small diameter fibers having known stretch capabilities. Also, these materials have adequate strength to support the weight of the load during deployment, use and recovery. As shown, the fibers of the strain member bundles extended longitudinally of the cable in a parallel arrangement and, to assure that the stretch capacity of both strain member bundles is the same, the fibers of both bundles can be of the same material. In the preferred implementation, nylon fibers having about a 5% stretch or elongation capacity are used. Outer strain member 13 is a sheath-like bundle of fibers enclosing inner core member 12 and its electrical winding.

As has been stated, all of the fiber interstices are impregnated with a water-proof plastic 16 to give uniform dimensions and to provide electrical insulation as well as to protect the cable from damage in going over the sheaves and through the snatch blocks etc. customarily associated with the mechanisms of winch 3. For this purpose, the plastic which impregnates the fibers also forms a protective coating 16a on the exterior of the outer strain member. In general, elastic cable 7 is coaxial, electrically-conductive cable that utilizes seawater as its outer conductor and, or course, the winding as its inner conductor. It functions as both an accumulator and a strain member. The stretching capacity of its fibers and its spiral winding permit the elongation needed to absorb the tension forces created by the constantly-moving ship.

An alternate cable construction is shown in FIG. 3. Specifically, rather than employing sea-water as an outer conductor, this construction includes an outer wire conductor 15. In some applications it is important to utilize the outer conductor to provide wide ban coaxial transmission line characteristics. Another modification shown in FIG. 3 is that inner member 12 of the cable, if desired, can be formed of a solid, soft elastomeric material rather than of fibers. This type of core provides the same accumulator actions as the strain fibers of FIG. 2 but it does not have commensurate strain capacity. Since the accumulator action is the same in both FIG. 2 and 3, subsequent consideration of the stretch capacity of the cable can be with reference to the FIG. 2 construction.

In the previous discussion it has been stated that the pitch of spiral winding 14 is a design factor requiring rather close control. The need for the control is to assure that the volume change of the interior of its helix as it is subjected to stretch elongation is closely matched to the concurrent volume change of the elastomer fibers and, particularly, to that of the elastomer core. In the volume changes are not so matched, the stretch of the cable may well cause the spiral conductor to be internally stretched beyond its limits and, consequently, broken. Also, as is known, differing volume changes may subject the conductors to internal compression or other distortions which detrimentally affect its electrical properties. For such reasons, a close volume change match is important and, as will be shown, this match is a function of the helix pitch of the winding which, in turn, is dependent upon the diameter of the inner core and upon the so-called Poisson ratio of the material used for the core. This well-known ratio defines the unit strain elongation of a rod of elastic material and the accompanying unit contraction in its lateral dimensions. Within elastic limits, the ratio is a constant for any given material such as the nylon fibers of the strain member bundles. When bundles of the fibers are being considered, the unit contraction of the lateral dimensions can be considered as a unit change in volume of the bundle which, for a circular core, is a function of the change in diameter.

The pitch helix of the conductors can be derived and applied by using the following equation: Pitch $1/L = (1/\pi) D\sqrt{\epsilon}$ in which $\epsilon$ is the Poisson ratio of the fiber material and D is the diameter of inner strain member or core 12. The pitch $1/L$ is the helix pitch in turns/unit length. This pitch equation, in turn, is derived by applying the following considerations:

Let $W = (\Delta V/V/\Delta L/L)$ in which W is the fractional change in volume for a fractional change in length. Now, with reference to FIG. 4, if a section of a cylinder which is equal to one turn of the helix is considered:

The length of the wire is:

$$S = \sqrt{(\pi D)^2 + L^2} \tag{1}$$

The volume of the cylinder is:

$$V = \pi D^2 L/4 \tag{2}$$

$$2LdL)/\sqrt{(\pi D^2 + L^2)} = 0 \tag{3}$$

i.e., the wire is not subjected to tensile stress so that it does not stretch.

$$dV/V = \left[ \frac{2\pi DL\, dD}{4} + \frac{\pi D^2}{4} dL \right] \frac{4}{\pi D^2 L} \tag{4}$$

from 3, $$dD = \frac{-L}{\pi^2 D} dL \tag{5}$$

$$dV/V = \left( \frac{2\pi DL \cdot L}{4\, \pi^2 D} + \frac{\pi D^2}{4} \right) \frac{4}{\pi D^2 L} dL$$

$$= \left( -\frac{L^2}{2} + \frac{\pi D^2}{4} \right) \frac{4}{\pi D^2} \frac{dL}{L}$$

$$W = \frac{dV/V}{dL/L} = \left( -\frac{2L^2}{\pi^2 D^2} + 1 \right)$$

For a long cylindrical rod of the elastomer, the change in volume is given by:

$$\Delta V/V = (1 - 2\epsilon)(\Delta L/L)$$

where $\epsilon$ is Poisson's ratio for the material. Thus, $$W = (\Delta V/V)/(\Delta L/L) = 1 - 2\epsilon$$

The design criterion is then $W_{helix} = W_{elastomer}$, $$-\frac{2L^2}{\pi^2 D^2} + 1 - 2\epsilon$$

$$\frac{2L^2}{\pi^2 D^2} = 2\epsilon \quad L = \pi D \sqrt{\epsilon}$$

The helix pitch in turns/unit length is:

$$\text{Pitch } 1/L = 1/\pi D \sqrt{\epsilon}$$

Applying the pitch equation, an elastic co-axial cable can be constructed which is of sufficient strength to support the loads and in which the wire conductor can stretch without breaking to closely follow the accumulator action of the strain member. The strength is dependent upon the fiber materials used as well as the size or diameter of the core. Similarly, the elongation is a function of the material used while the Poisson ratio of the material, along with the diametrical dimension, determines the helix pitch. If an outer conductor such as outer winding 15 (FIG. 3) is used, its pitch or helix is subject to the same constraints on pitch as the inner one.

In the preferred form of the invention shown in FIG. 1, elastic cable 7 is used as a relatively short section of the entire length of the support cable with the balance of the support being provided by a conventional co-axial cable which may have inner and outer conductors and, in all probability, be armored. Since the conventional co-axial cable is a relatively inelastic member, the elastic cable section must provide the stretch needed for its accumulator action. In practice, the length of the elastic section is limited to that needed to absorb the forces exerted by the wave action for which the cable is designed. For example, if waves of ten feet are a design criterion, the length of the elastic section will be determined by the stretchability of its fibers which, if nylon is used, is about 5%.

The manner in which the elastic section is coupled into the balance of the supporting cable is of some importance. In general, any type of coupling which provides the necessary mechanical strength and the necessary electrical connection can be used. However, the coupling itself should not interfere with the essential accumulator action and, for this reason, should have some elasticity as well as flexibility. A presently preferred type of coupling is illustrated in FIGS. 5 and 6 and, in general, this coupling uses a so-called Kellem's Grip which, in FIG. 5, is shown as an endless weave of steel strands 20 which tightly surround and engage the cable lengths being coupled. The Kellem's Grip is a commercial product marketed by Kellems of Stonington, Connecticut. Functionally, it can be considered as an application of the familiar Chinese finger grip mechanism in which the gripping force increases with the force applied to it.

Referring to FIGS. 5 and 6 it will be recognized that the Kellem's Grip extends longitudinally over each coupling 9 and 11 (FIG. 1) and over a length of cable sections 7 and 8 which are being coupled. However, in some applications it may be preferred to couple section 7 directly to the load at one end and to cable 8 at the other. An internal splicing arrangement of each coupling is shown in FIG. 6 although the illustrated arrangement is intended only as one example of a variety of arrangements that could be substituted. As shown, it couples an end of elastic cable 7 to an end of the conventional inelastic co-axial cable 8 which, for present purposes, can be considered as having an inner conductor 21, the usual insulation and an outer armor 22. Inner conductor 21 terminates in a copper swage block 23 which is serrated and to which the end of spiral winding 14 is compression swaged to form the electrical connection. Also, a nylon monofilament 24 is used to mechanically anchor the fibers of inner strain member 12 to the swage block. Helical member 15, if used, is soldered to a braid 26 carried by cable 8. Insulating tape 27 is wrapped around the swaged electrical coupling and around the soldered braid connection to firmly secure these members. Although FIG. 6 does not show the Kellem's Grip member 20 (FIG. 5) it will be appreciated that the grip extends over the lengths of both coupled cable sections. Such a coupling provides sufficient mechanical strength as well as a reliable electrical connection although, in making the coupling, the strain terminations should be pre-stressed to relieve tension at the splice.

It is believed that the operation of the elastic strain cable should be clear from the foregoing description. As has been stated, it may be used as a relatively short section of a conventional cable to facilitate, for example, the operation of a remotely-controlled bottom crawling vehicle from a conventional oceanographic ship. The accumulator action of the cable permits the maintenance of a small tension in the cable so that the vehicle can remain in position on the bottom even though the ship is undergoing motion due to wave action. Such modulation of the electrical properties of the cable as may result from the elasticity can easily be filtered out to prevent interference with control and data functions. In general, the strain cable is an unusually simple, inexpensive and reliable device capable of reliably resolving the wave motion problem experienced in operations involving shipboard deployment or oceanographic objects by means of a co-axial cable.

Obviously many modifications and variations of the present invention are possible in the light of the above teachings. It is therefore to be understood that within the scope of the appended claims the invention may be practiced otherwise than as specifically described.

We claim:

1. An elastic electrically-conductive strain cable comprising:
   an inner member providing an axially-extending core having a circular cross-section of a predetermined diameter,
   electrically-conductive wire means helically wound on said inner member throughout its length,
   an outer strain member surrounding said inner member and said helical wire means,
   said outer strain member being a bundle of fibers disposed in a substantially parallel arrangement and both said inner and outer members also being formed of a elastomeric material selected in accordance with their elastic properties and Poisson ratio characteristics, and
   an insulating plastic impregnating the interstices of the fiber bundle for binding the inner and outer members and the helical wire means together into said fixed circular geometry, said wire means being wound with a particular helical pitch in turns/unit length with the pitch being so related to said inner member diameter and to said Poisson ratio that, when said cable is tensioned, the fractional change in volume per fractional change in length is substantially the same for both said wire means and said elastomeric members.

2. The strain cable of claim 1 wherein said inner member also is a strain member formed of fibers disposed in a substantially parallel arrangement.

3. The strain cable of claim 2 wherein said plastic fibers are formed of the same material.

4. The strain cable of claim 1 wherein said insulating plastic also provides an external coating on said outer strain member capable of protecting said cable against physical damage.

5. The strain cable of claim 1 wherein said cable is adapted to provide support and electrical energy for a submerged object suspended in sea water from a sea-borne floating platform,
said cable providing said support and being a co-axial cable having said wire means as an inner conductor and said sea-water as an outer conductor.

6. A strain cable for supporting and electrically energizing a submerged object suspendably carried in seawater by a sea-borne floating platform comprising:
an essentially inelastic electrically-conductive cable section carried by said floating platform and providing the major length of said object support, and
an elastic strain cable section formed of a co-axial cable having said sea-water as an outer electrical conductor, said elastic section being electrically and mechanically coupled to said inelastic section and including:
an inner strain member providing an axial core for said section,
electrically-conductive wire means helically wound on said inner strain member throughout its length,
an outer strain member surrounding in intimate contact said inner member and said wound wire means,
said inner and outer strain members being bundles of elastomeric axially-extending fibers formed of a plastic material having known elastic properties, and
an insulating plastic impregnating the interstices of the fiber bundles for binding the strain members and the helical wire means together in said fixed geometry;
the relative length of said elastic section being a function of the elasticity of said fibers to the extent that said length is substantially limited to that needed by the elastic fibers to stretchably absorb a tension force produced by a maximum wave-produced motion of said floating platform.

7. The strain cable of claim 6 wherein said inner strain member is formed with a circular cross-section of a predetermined diameter and said plastic fibers of said inner and outer strain members are formed of materials having the same elastic properties including their Poisson ratio characteristics,
said wire means being wound with a particular helical pitch in turns/unit length with the pitch being so related to said inner member diameter and to said Poisson ratio that, when said cable section is tensionned, the fractional change in volume per fractional change in length is substantially the same for both said wire means and said fibers.

8. The strain cable of claim 7 wherein said insulating plastic material also provides an external coating on said outer strain member capable of protecting said cable section against physical damage.

* * * * *